United States Patent [19]
Gutleber
[11] 4,431,999
[45] Feb. 14, 1984

[54] INTERFERENCE CANCELLING SYSTEM USING A NOTCH AND OMNIDIRECTIONAL ANTENNA

[75] Inventor: Frank S. Gutleber, Little Silver, N.J.

[73] Assignee: The United States of America as represented by the Secretary of the Army, Washington, D.C.

[21] Appl. No.: 396,200

[22] Filed: Jul. 8, 1982

Related U.S. Application Data

[63] Continuation of Ser. No. 114,547, Jan. 23, 1980, abandoned, which is a continuation of Ser. No. 970,017, Dec. 18, 1978, abandoned.

[51] Int. Cl.[3] .......................... H01Q 3/30; H04B 7/00
[52] U.S. Cl. ...................................... 343/381; 343/367
[58] Field of Search ................. 343/844, 854, 100 LE, 343/853, 100 CL

[56] References Cited

U.S. PATENT DOCUMENTS

| | | | |
|---|---|---|---|
| 3,130,410 | 4/1964 | Gutleber | 343/844 |
| 3,605,106 | 9/1971 | Gutleber | 343/844 |
| 3,916,408 | 10/1975 | Evans | 343/100 CL |
| 3,916,417 | 10/1975 | Wong et al. | 343/854 |
| 3,938,154 | 2/1976 | Lewis | 343/100 CL |
| 3,964,065 | 6/1976 | Roberts et al. | 343/100 LE |
| 3,981,014 | 9/1976 | Masak | 343/100 LE |
| 4,275,397 | 6/1981 | Gutleber | 343/100 CS |

*Primary Examiner*—Eli Lieberman
*Attorney, Agent, or Firm*—Robert P. Gibson; Jeremiah G. Murray; Edward P. Griffin, Jr.

[57] ABSTRACT

The described system utilizes a pair of antenna beam patterns, one of which is adapted to provide the desired signal and all interfering signals, and the other of which is adapted to provide only the interfering signals. The patterns are then combined to produce substantially only the desired signal as the combined output.

3 Claims, 6 Drawing Figures

INTERFERENCE CANCELLING SYSTEM USING A NOTCH AND OMNIDIRECTIONAL ANTENNAThe invention described herein may be manufactured and used by or for the Government for governmental purposes without the payment of any royalties thereon or therefor.

This application is a continuation of application Ser. No. 114,547, filed Jan. 23, 1980, which is a continuation of application Ser. No. 970,017 filed Dec. 18, 1978, both of Frank S. Gutleber entitled "Interference Cancelling System", both now abandoned.

FIELD OF THE INVENTION

This invention relates to communications systems and, more particularly, to communications systems in which simple, relatively inexpensive arrangements are utilized to automatically eliminate or reduce external interference.

BACKGROUND OF THE INVENTION

As is well known and understood, one of the major concerns of designers of antenna system communication links is the elimination or reduction of external interference sources, such as jamming, self-interference, atmospheric noise, man-made noise, and acoustic noise. As is also well known, most of the arrangements which attempt to resolve these problems of external interference do so in a relatively complex manner, oftentimes utilizing very large directional antennas and/or with antennas having hundreds, or even more, elements. This problem of external interference is especially prevalent in the area of mobile communications systems where omnidirectional antennas are employed, because of the large numbers of users operating in the same frequency band and because of multipath. Use of very large directional antennas in such mobile arena will be seen to be almost a physical impossibility, and an economic impracticality.

SUMMARY OF THE INVENTION

As will become clear hereinafter, the interference canceling system of the present invention affords an operation which simulates that of a directional antenna in eliminating, or reducing, external interference sources, but with simple and inexpensive circuitry, and with a small number of antenna elements (typically, anywhere from 2 to 8). In a first embodiment of the invention, orthogonal multiplexing is employed in conjunction with a notch antenna to cancel interference arriving from all directions except over the narrow beam width portion formed with the notched antenna. As will be seen, in such version an almost omnidirectional antenna is utilized with a narrow notch, or nulled-out beamwidth, along with a full omnidirectional antenna to enable implementation of the system with simple, small antennas. In a second embodiment of the invention, the amplitude in element separation of an array antenna are predetermined to obtain a steep slope in its beam pattern, with the output being progressively phase shifted and combined to provide a duplicate beam pattern for subsequent subtraction so as to eliminate interference from all directions except over a small angular sector. In such version, the requirement for orthogonally multiplexing two channels through the receiver is obviated, so as to provide a further cost savings.

BRIEF DESCRIPTION OF THE DRAWING

These and other features of the present invention will be more readily understood from a consideration of the following description taken in connection with the accompanying drawing in which.

DETAILED DESCRIPTION OF THE DRAWING

Figure 1:
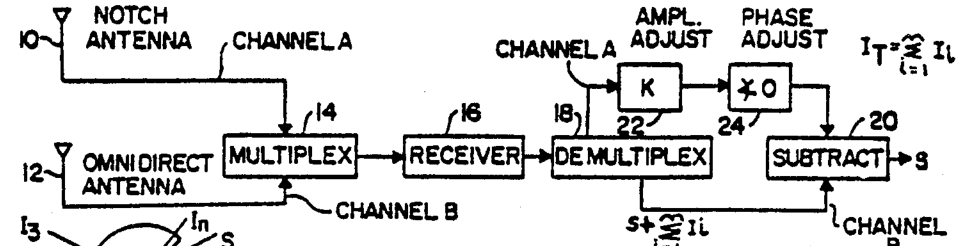
FIG. 1 is a functional block diagram of a multiplexed interference cancelling receiver system constructed in accordance with the invention.

The interference canceling system shown in FIG. 1 eliminates, or reduces interference in a transmission link by utilizing orthogonal multiplexing in conjunction with a notch antenna (i.e., an antenna which has a single deep null over a small angular beam width). The inset alongside FIG. 1 represents the beam pattern of an almost omnidirectional antenna 10 having a narrow notch or nulled-out beamwidth, in which "S" represents the desired signal received and "$I_1$", "$I_2$", "$I_3$", . . . "$I_n$" represents external interference signals. The output of the notch antenna 10 (channel A) is orthogonally multiplexed with the output of an omnidirectional antenna 12 (channel B), with the multiplexing being of time, frequency or space method so long as the signals from the antennas 10, 12 are rendered non-interfering with each other. The output from the multiplexer 14 is then amplified in a receiver 16, and then separated in a de-multiplexer 18. A subtractor 20 is employed, to one input of which is provided the output of de-multiplexer 18 which corresponds to the channel B signal, as comprising the desired information, plus all of the interfering signals from the external sources. On the other hand, by rotating the notch antenna 10 (or electronically scanning it) until its notch is pointing in the direction of the desired signal (as shown in the inset), then the output from the de-multiplexer 18 which corresponds to the channel A signal would contain all of the interfering signals, but not the desired signal. This second output provides a coherent and correlated replica of all the interference associated with the signal entering the omnidirectional antenna 12, and is provided as the other input to the subtractor 20. By including amplitude and phase adjust circuits 22, 24 in this second branch, to account for any inherent differences in gain and delay in the two orthogonal channels, the de-multiplexed output from the notch antenna 10 can be directly subtracted from the de-multiplexed output from the omnidirectional antenna 12 to yield a totally interference free signal.

A major advantage of this FIG. 1 embodiment will be seen to be that all interference entering the antenna 10 which is outside of the notched beam is virtually eliminated without requiring any complex adaptive processing, or requiring a large complex narrow beam antenna.

This makes the FIG. 1 system desirable for mobile communications usage, and for small, lightweight, tactical communications equipment.

As will be readily apparent to those skilled in the art, the notch antenna 10 of FIG. 1 represents the main element in the interference cancelling system there described, and introduces different requirements for operation than are normally encountered in typical antenna design. For example, instead of being concerned with a design which forms a directive beam having low sidelobes, or designing an adaptive system having several movable nulls, the antenna engineer is here concerned with providing a fixed pattern which contains uniform reception in all directions, except for that in which the normal beam slot points. Additionally, to be effective, the antenna design needs a slope in the pattern developed, at the point of null, and to be as steep a slope as is practical. Such a required pattern is illustratively shown in FIG. 2.

Figure 2:
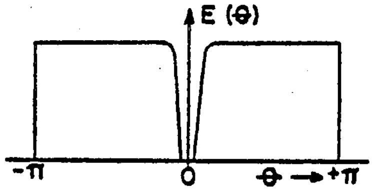
FIG. 2 is a simplified illustration of an antenna pattern helpful in an understanding of the block diagram of FIG. 1.

General design procedures for providing an array antenna having the type of pattern shown in FIG. 2 are described in my U.S. Pat. Nos. 3,130,410 and 3,605,106, and reports. As noted therein, such patterns are made up of products and/or sums of Sin mx/Sin x functions, and can be achieved by controlling both the amplitudes and spacings of array antenna elements. As a result, the slope of a null in an antenna beam pattern can be made steep, either by providing one or more Sin mx/Sin x terms or by appropriate amplitude and phase controls when summing several Sin mx/Sin x functions using sub-arrays. Further explanation can be had by referring to these patents, the disclosures of which are hereby incorporated by reference, as well as to the article "Coded-Linear-Array Antenna", published in Volume 39, No. 2, of Electrical Communications Magazine.

Figure 3:
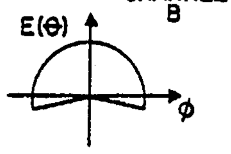
FIGS. 3 and 4 are simplified illustrations of an alternative antenna pattern and resultant beam processing applicable to a modification of the interference canceling system of FIG. 1.
Figure 4:
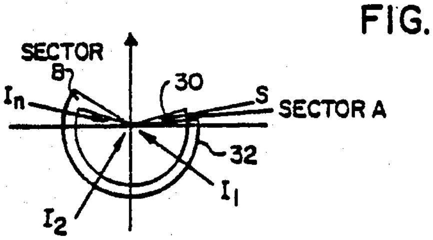

An alternative version of a notch antenna that could be used with the FIG. 1 cancelling system is one having a steep slope, but with a somewhat wider nulled beamwidth, as shown in FIG. 3. With this version, the antenna pattern can be electronically scanned to provide a second received beam which is angularly displaced by a small amount. The two beams 30,32 (FIG. 4) could then be positioned so that the desired signal "S" lies near the edge of one receiving beam, e.g. 30, while being nulled out of the second receiving beam, 32. Although this alternative scheme continues to null out the interference sources $I_1$, $I_2$, . . . $I_n$, it does introduce a second sector (sector B) which is vulnerable to interferences. However, the beam width of sector A, wherein the desired signal S is being received, (and therefore, sector B) can be made very small. Such an alternative approach might be useful where it is found more practical to design an array antenna with a steeper slope and wider notch beamwidth than as illustrated in FIG. 2.

Figure 5:
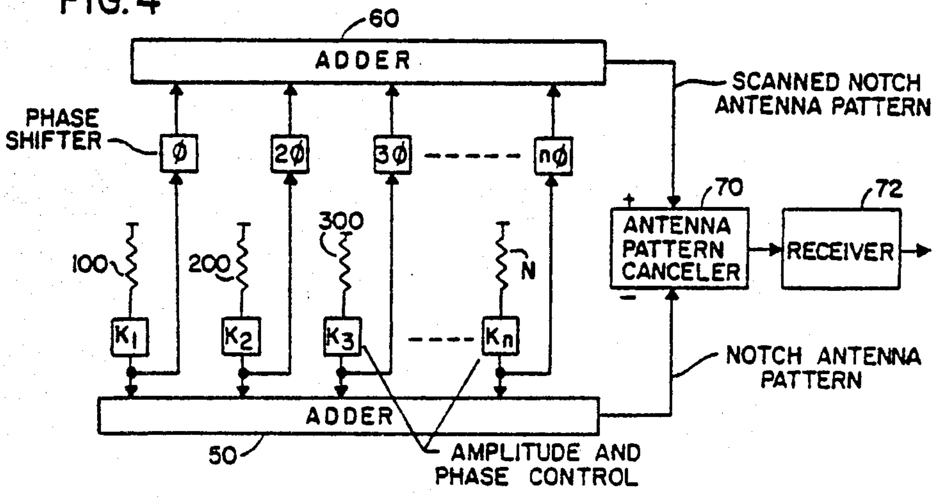
FIG. 5 is a functional block diagram of an interference cancelling antenna system constructed in accordance with the invention.

The functional block diagram of FIG. 5 is intended for use with a second embodiment of the invention in which cancellation of the interference is provided at radio frequencies directly at the antenna elements themselves, and without the need for orthogonally multiplexing two channels. A significant savings in cost will be seen to result, and again follows in part, from the ability to predetermine the amplitude and element separations of an array antenna so as to obtain a steep slope and a narrow beam slot. The antenna elements are here represented by the reference numerals 100, 200, 300, . . . N, with each having its signal output being applied to an adder 50 by means of amplitude and phase control circuits $K_1$, $K_2$, $K_3$, . . . $K_n$. A second adder 60 is employed, to the inputs of which are received the outputs of the amplitude and phase control circuits, but progressively phase shifted by circuits $\phi$, 2 $\phi$, 3 $\phi$, . . . n $\phi$. The result of this combination is to provide a duplicate beam pattern from the adder 60 which is scanned by the small angular segments, $\phi$, as compared to the output of the adder 50. The two adder outputs are then coupled to an antenna pattern canceller 70, wherein the output of the scanned pattern is linearly subtracted from the original notch beam pattern to provide a substantially complete cancelation of the interference, with the resultant signal then being provided at receiver 72.

Figure 6:
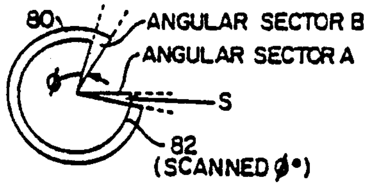
FIG. 6 is a simplified illustration of the resultant antenna beam processing applicable to the interference canceling antenna system of FIG. 5.

In actuality, the subtraction is not a complete one, as can be seen from the resultant beam processings of FIG. 6. The received notch antenna beam pattern is shown as 80, while the scanned notch antenna pattern is shown as 82. As in the illustration of FIG. 4, interference is not completely cancelled in the two small angular sectors A and B. As will be appreciated, if the notch in the antenna pattern is sufficiently narrow, then, if omnidirectional antenna elements are utilized, it would only become necessary to use the center element as the second input to the pattern canceler 70. To guarantee that the interference from both adders 50, 60 would be exactly in phase, independent of the direction of arrival of the interfering signals, either the progressive phase shift should be symmetrical about such center element, or the composite initial beam pattern should be phase shifted by (n O)/2.

As with the configuration of FIG. 1, the construction according to this embodiment of the invention could be utilized to large advantage in any communications link where it is desirable, or necessary, to eliminate or reduce external interference, such as from a jammer, atmospheric noise, man-made noise, etc. Any quantity of such interfering sources that enter the antenna from outside the overlapped narrow beam sectors would thus be simultaneously eliminated, without the requirement of any complex adaptive processing being needed.

While there have been described what are considered to be illustrative embodiments of the present invention, it will be readily apparent to those skilled in the art that modifications may be made without departing from the scope of the teachings herein of providing interference characteristics commensurate with a directional antenna having a very narrow beam, but of substantially reduced size—analysis showing that significant improvements can be attained with just a pair of antenna elements, and that substantial improvement results with no more than the employment of 8 such elements. Besides being easier to build, and immensely cheaper, the interference cancelling systems of the present invention enable operation to continue even at the lower frequencies where otherwise very large directional antennas are required. With the invention, it becomes but a simple matter to incorporate the systems in a mobile environment, as the physical constraints no longer prevent employment of the antenna system on a moving motor vehicle.

What is claimed is:

1. A method of cancelling interference in a communication system comprising:

receiving signals from substantially all directions on an omnidirectional antenna means;

receiving coherent and correlated signals from substantially all directions except in the direction of a desired signal on a directable notch antenna means;

adjusting the amplitude and phase of said signals received by said notch antenna means to match said signals received by said omnidirectional antenna means; and subtracting signals received on said directable notch antenna means from signals received on said omnidirectional antenna means.

2. An interference cancelling communication system comprising:

an omnidirectional antenna means, having gain in all directions, for providing a first output signal including a desired signal and all interfering signals;

a directional notch antenna means, having substantially the same gain as said omnidirectional antenna means in substantially all of said directions except for a relatively steep, narrow null sector, for providing a second output signal which is coherent and correlated with said first output signal except for signals arriving in the direction of said null sector;

means connected to the output of said omnidirectional antenna means and said notch antenna means for subtracting said second output signal from said first output signal.

3. The system of claim 2 wherein said omnidirectional antenna means and said notch antenna means have a common center axis of radiation.

* * * * *